United States Patent Office 3,438,967
Patented Apr. 15, 1969

---

3,438,967
WATER-INSOLUBLE MONOAZO DYESTUFFS
Paul Rhyner, Basel, and Klaus Artz, Muttenz, Switzerland, assignors to Ciba Limited, Basel, Switzerland, a Swiss company
No Drawing. Filed Apr. 29, 1964, Ser. No. 363,616
Claims priority, application Switzerland, May 3, 1963, 5,585/63; Mar. 5, 1964, 2,847/64
Int. Cl. C09b *29/34;* C07c *121/78;* D06p *1/02*
U.S. Cl. 260—207.1      6 Claims The present invention provides new, valuable water-insoluble monoazo dyestuffs of the formula

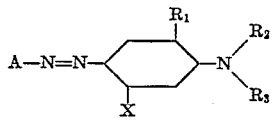

in which A represents a benzene radical containing at most one nitro group, $R_1$ represents a hydrogen atom or an alkyl or alkoxy group, $R_2$ represents a cyanoalkoxyalkyl group, $R_3$ represents a hydrogen atom or a cyanoalkoxyalkyl group or an acyloxyalkyl group, and X represents an acylamino group.

The new dyestuffs are obtained when a diazo compound of an aminobenzene containing at most one nitro group is coupled with a coupling component of the formula

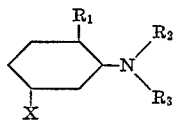

in which $R_1$, $R_2$ and $R_3$ have the meanings given above.

The amines to be used as diazo components advantageously contain a nitro group in para-position to the amino group, and advantageously correspond to the formula

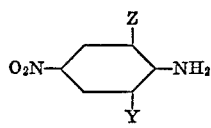

in which Y represents a hydrogen or halogen atom or a cyano- or carbalkoxy group, and Z represents a hydrogen or halogen atom or an alkyl group.

The following amines may be mentioned as examples:

1-amino-4-methylbenzene,
1-amino-4-chlorobenzene,
1-amino-4-bromobenzene,
1-amino-4-nitrobenzene,
1-amino-4-cyanobenzene,
1-amino-4-methylsulfonylbenzene,
1-amino-4-carboxylic acid methyl ester,
1-amino-4-chloromethylsulfone,
1-amino-4-cyanoethylsulfone,
1-amino-2:4-dichlorobenzene,
1-amino-2-methyl-4-chlorobenzene,
1-amino-2-trifluoromethyl-4-chlorobenzene,
1-amino-2-cyano-4-chorobenzene,
1-amino-2-chloro-4-cyanobenzene,
1-amino-2-chloro-4-nitrobenzene,
1-amino-4-chloro-2-methylsulfonylbenzene,
1-amino-2-chloro-4-methylsulfonylbenzene,
1-amino-2:4-dicyanobenzene,
1-amino-2-cyano-4-methylsulfonybenzene,
1-amino-4-cyano-2-methylsulfonylbenzene,
1-amino-2:4-bis-(methylsulfonyl)-benzene,
1-amino-2:6-dichloro-4-nitrobenzene,
1-amino-2:6-dibromo-4-methylsulfonylbenzene,
1-amino-2-methyl-4-nitrobenzene,
1-amino-2-trifluoromethyl-4-nitrobenzene,
1-amino-2-chloro-4-nitrobenzene,
1-amino-2-cyano-4-nitrobenzene, and
1-amino-2-methylsulfonyl-4-nitrobenzene.

The coupling components used are advantageously amines of the formula

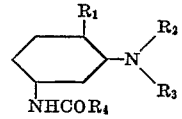

in which $R_1$, $R_2$ and $R_3$ have the meanings given above, and $R_4$ represents a hydrogen atom or an alkyl, cycloalkyl or alkoxy group that may be substituted, and especially those of the formula

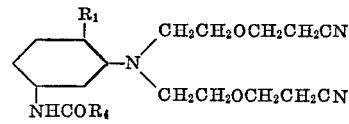

in which $R_1$ and $R_4$ have the meanings given above.

Valuable results are likewise obtained with coupling components of the formulae

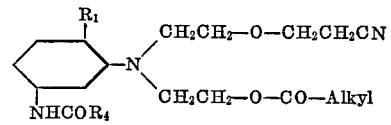

and

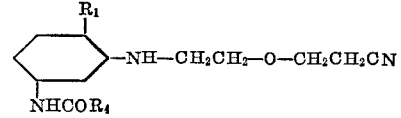

in which $R_1$ and $R_4$ have the meanings given above, and alkyl may represent, for example, a methyl, ethyl or propyl group.

As examples the following coupling components may be mentioned:

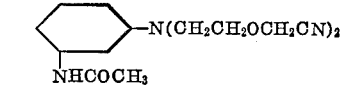

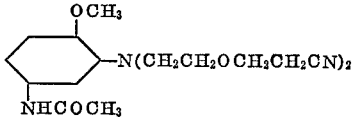

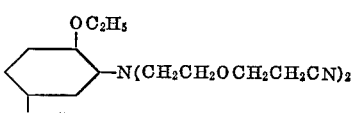

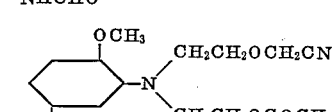

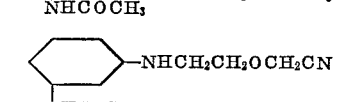

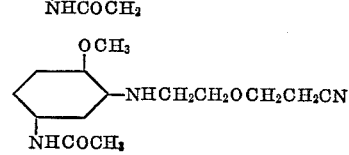

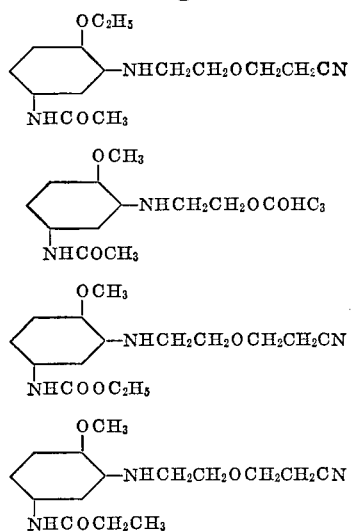

The above-mentioned coupling components may be obtained by known methods, for example, by additively combining 2 mols of acrylonitrile with the appropriate di-(hydroxyethyl)-aniline, or by additively combining 1 mol of acrylonitrile with the appropriate monohydroxyethylaniline, or by reacting a monocyanoethyl-di-(hydroxyethyl)-aniline with a carboxylic acid halide or anhydride.

The diazotization of the above-mentioned diazo components may be carried out by known methods, for example, with the aid of a mineral acid, especially hydrochloric acid, and sodium nitrite, or, for example, with a solution of nitrosyl-sulfuric acid in concentrated sulfuric acid.

The coupling may likewise be carried out by known methods, for example, in a neutral to acid medium, if desired or required, in the presence of sodium acetate or similar buffers or catalysts that influence the rate of coupling, for example, pyridine or salts thereof.

After the coupling reaction the dyestuffs formed may be separated from the coupling mixture, for example, by filtration because they are virtually insoluble in water.

Instead of the single diazo component, it is possible to use a mixture of two or more of the diazo components of the invention and, instead of a single coupling component, it is also possible to use a mixture of two or more of the coupling components of the invention.

After conversion into a finely divided form, the new monoazo dyestuffs are eminently suitable for the dyeing of synthetic fibers, especially fibers made of aromatic polyesters. They yield deep, orange to violet dyeings possessing a good fastness to light and to sublimation.

The following examples illustrate the invention. Unless otherwise stated, the parts and percentages are by weight.

EXAMPLE 1

13.8 parts of 1-amino-4-nitrobenzene were dissolved in 30 parts of water and 30 parts of concentrated hydrochloric acid. After the addition of 80 parts of ice, 6.9 parts of sodium nitrite were introduced and the mixture stirred until the diazo solution was clear and almost colorless. The diazo solution thus obtained was run into a solution of 33.3 parts of 3-acetamino-N-(β-cyanoethoxyethyl) N-acetoxyethylaniline in 200 ml. of 2 N hydrochloric acid. The dyestuff of the formula

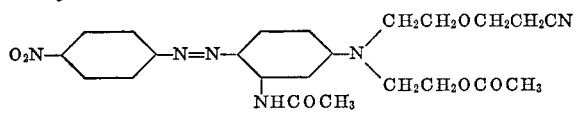

was precipitated by the addition of a saturated sodium acetate solution. The dyestuff thus obtained dyed acetate silk, nylon, triacetate rayon and polyester fibers red tints.

EXAMPLE 2

17.25 parts of 1-amino-2-chloro-4-nitrobenzene were introduced in portions to 60 parts of concentrated sulfuric acid in which 6.9 parts of sodium nitrite had been dissolved. A clear, yellow solution was obtained by pouring the solution on to 400 parts of ice.

The diazo solution so obtained was added as in Example 1 to a solution of 33.3 parts of 3-acetamino-N-(β-cyanoethoxyethyl)N - acetoxyethylaniline in 200 ml. of 2 N hydrochloric acid. The dyestuff which was precipitated by the addition of sodium acetate dyed acetate silk, nylon, triacetate rayon and polyester fibers dark red tints.

EXAMPLE 3

16.3 parts of 1-amino-2-cyano-4-nitrobenzene were diazotized in the manner described in Example 2.

The diazo solution so obtained was added as in Example 1 to a solution of 33.3 parts of 3-acetamino-N-(β-cyanoethoxyethyl)-N-acetoxyethylaniline in 200 ml. of 2 N hydrochloric acid. The resulting dyestuff, which was completely precipitated by addition of sodium acetate, dyed acetate silk, nylon, triacetate rayon and polyester fibers violet tints.

EXAMPLE 4

19.6 parts of 1-amino-2-carbomethoxy-4-nitrobenzene were diazotized in the manner described in Example 2.

The diazo solution so obtained was added as in Example 1 to a solution of 33.3 parts of 3-acetamino-N-(β-cyanoethoxyethyl)-N-acetoxyethylaniline in 200 ml. of 2 N hydrochloric acid. The dyestuff which was precipitated with sodium acetate dyed acetate silk, nylon, triacetate rayon and polyester fibers bluish red tints.

EXAMPLE 5

13.8 parts of 1-amino-4-nitrobenzene were dissolved in 30 parts of water and 30 parts of concentrated hydrochloric acid. After the addition of 80 parts of ice, 6.9 parts of sodium nitrite were introduced and the mixture was stirred until the diazo solution was clear and almost colorless. The diazo solution so obtained was allowed to run into a solution that contained 0.1 mol of a mixture comprising 3-acetamino-N-(β-cyanoethoxyethyl)-aniline and 3-acetamino-N:N-bis-(β-cyanoethoxyethyl)-aniline in 200 ml. of 2 N. hydrochloric acid. By the addition of a saturated sodium acetate solution, a dyestuff was precipitated that dyed acetate silk, nylon, triacetate rayon and polyester fibers red tints possessing a very good fastness to light and sublimation.

The mixture of 3-acetamino-N-(β-cyanoethoxyethyl)-aniline and 3-acetamino - N:N - bis - (β-cyanoethoxyethyl)-aniline used as coupling component in this example could be obtained, for example, by heating 3-acetamino-amine with β - cyanoethyl - β - chlorethylether in the presence of an alkali. The ratio of mono- and dialkylated product was determined by the reaction time. After its titre had been determined, the crude product could be used directly for the manufacture of dyestuffs. The coupling components used in the following examples could be prepared by the same process.

EXAMPLE 6

17.25 parts of 1-amino-2-chloro-4-nitrobenzene were introduced in portions into 60 parts of concentrated sulfuric acid in which 6.9 parts of sodium nitrite had been dissolved. A clear, yellow solution was obtained by pouring the mixture on to 400 parts of ice.

The diazo solution so obtained was added as in Example 5 to 0.1 mol of a mixture comprising 3-acetamino-N-(β-cyanoethoxyethyl)-aniline and 3-acetamino - N:N-bis-(β-cyanoethoxyethyl)-aniline in 200 ml. of 2 N hydrochloric acid. The dyestuff precipitated by the addition of sodium acetate dyed acetate silk, nylon, triacetate rayon and polyester fibers red tints.

EXAMPLE 7

16.3 parts of 1-amino-2-cyano-4-nitrobenzene were diazotized in the manner described in Example 6.

The diazo solution so obtained was added as in Example 5 to 0.1 mol of a mixture comprising 3-acetamino-N-($\beta$-cyanoethoxyethyl)-aniline and 3-acetamino - N:N-bis-($\beta$-cyanoethoxyethyl)-aniline in 200 ml. of 2 N hydrochloric acid and the dyestuff precipitated by the addition of sodium acetate. The dyestuff so obtained dyed acetate silk, nylon, triacetate rayon and polyester fibers violet tints.

EXAMPLE 8

19.6 parts of 1-amino-2-carbomethoxy-4-nitrobenzene were diazotized in the manner described in Example 2.

The diazo solution so obtained was added as in Example 5 to 0.1 mol of a mixture comprising 3-acetamino-N-($\beta$-cyanoethoxyethyl)-aniline and 3-acetamino - N:N-bis-($\beta$-cyanoethoxyethyl)-aniline in 200 ml. of 2 N hydrochloric acid. The dyestuff precipitated by the addition of sodium acetate dyed acetate silk, nylon, triacetate rayon and polyester fibers red tints.

In the following table a number of further diazo components are listed in Column 2 which when diazotized in the manner described in the preceding examples and coupled with a coupling component of the formula

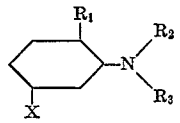

give similar dyestuffs. The meanings of $R_1$, $R_2$, $R_3$ and X are indicated in Columns 3 to 6. The tints obtainable on polyester fibers with the said dyestuffs are indicated in Column 7.

| No. | Diazo Component | $R_1$ | $R_2$ | $R_3$ | X | Tint on polyester fiber |
|---|---|---|---|---|---|---|
| 1 | NH$_2$-C$_6$H$_3$(NO$_2$)- | CH$_3$ | —C$_2$H$_4$OC$_2$H$_4$CN | —C$_2$H$_4$OC$_2$H$_4$CN | —NHCOCH$_3$ | Red. |
| 2 | Same as No. 1 above | CH$_3$ | —C$_2$H$_4$OC$_2$H$_4$CN | —C$_2$H$_4$OC$_2$H$_4$CH | —NHCOCH$_2$CH$_3$ | Red. |
| 3 | do | H | —C$_2$H$_4$OC$_2$H$_4$CN | —C$_2$H$_4$OC$_2$H$_4$CN | —NHCOCH$_2$CH$_3$ | Red. |
| 4 | do | CH$_3$ | —C$_2$H$_4$OC$_2$H$_4$CN | —C$_2$H$_4$OC$_2$H$_4$CN | —NHCO(CH$_2$)$_2$CH$_3$ | Red. |
| 5 | do | H | —C$_2$H$_4$OC$_2$H$_4$CN | —C$_2$H$_4$OC$_2$H$_4$CN | —NHCO(CH$_2$)$_2$CH$_3$ | Red. |
| 6 | do | CH$_3$ | —C$_2$H$_4$OC$_2$H$_4$CN | —C$_2$H$_4$OC$_2$H$_4$CN | —NHCOOCH$_3$ | Red. |
| 7 | do | H | —C$_2$H$_4$OC$_2$H$_4$CN | —C$_2$H$_4$OC$_2$H$_4$CN | —NHCOOCH$_3$ | Red. |
| 8 | do | CH$_3$ | —C$_2$H$_4$OC$_2$H$_4$CN | —C$_2$H$_4$OC$_2$H$_4$CN | —NHCOOC$_2$H$_5$ | Red. |
| 9 | do | H | —C$_2$H$_4$OC$_2$H$_4$CN | —C$_2$H$_4$OC$_2$H$_4$CN | —NHCOOC$_2$H$_5$ | Red. |
| 10 | do | CH$_3$ | —C$_2$H$_4$OC$_2$H$_4$CN | H | —NHCOCH$_3$ | Red. |
| 11 | do | CH$_3$ | —C$_2$H$_4$OC$_2$H$_4$CN | H | —NHCOCH$_2$CH$_3$ | Red. |
| 12 | do | H | —C$_2$H$_4$OC$_2$H$_4$CN | H | —NHCOCH$_2$CH$_3$ | Red. |
| 13 | do | CH$_3$ | —C$_2$H$_4$OC$_2$H$_4$CN | H | —NHCO(CH$_2$)$_2$CH$_3$ | Red. |
| 14 | do | H | —C$_2$H$_4$OC$_2$H$_4$CN | H | —NHCO(CH$_2$)$_2$CH$_3$ | Red. |
| 15 | do | CH$_3$ | —C$_2$H$_4$OC$_2$H$_4$CN | —C$_2$H$_4$OC$_2$H$_4$CN | NHCOOCH$_3$ | Red. |
| 16 | do | H | —C$_2$H$_4$OC$_2$H$_4$CN | —C$_2$H$_4$OC$_2$H$_4$CN | NHCOOCH$_3$ | Red. |
| 17 | do | CH$_3$ | —C$_2$H$_4$OC$_2$H$_4$CN | —C$_2$H$_4$OC$_2$H$_4$CN | —NHCOOC$_2$H$_5$ | Red. |
| 18 | do | H | —C$_2$H$_4$OC$_2$H$_4$CN | —C$_2$H$_4$OC$_2$H$_4$CN | —NHCOOC$_2$H$_5$ | Red. |
| 19 | do | H | —C$_2$H$_4$OC$_2$H$_4$CN | —C$_2$H$_4$OCOCH$_3$ | —NHCOCH$_2$CH$_3$ | Red. |
| 20 | do | H | —C$_2$H$_4$OC$_2$H$_4$CN | —C$_2$H$_4$OCOCH$_3$ | —NHCOOC$_2$H$_5$ | Red. |
| 21 | NH$_2$-C$_6$H$_3$(Cl)(NO$_2$)- | H | —C$_2$H$_4$OC$_2$H$_4$CN | —C$_2$H$_4$OC$_2$H$_4$CN | —NHCOCH$_2$CH$_3$ | Red. |
| 22 | Same as No. 21 above | CH$_3$ | —C$_2$H$_4$OC$_2$H$_4$CN | —C$_2$H$_4$OC$_2$H$_4$CN | —NHCOCH$_3$ | Red. |
| 23 | NH$_2$-C$_6$H$_3$(CN)(NO$_2$)- | CH$_3$ | —C$_2$H$_4$OC$_2$H$_4$CN | —C$_2$H$_4$OC$_2$H$_4$CN | —NHCO(CH$_2$)$_2$CH$_3$ | Violet. |
| 24 | Same as No. 23 above | H | —C$_2$H$_4$OC$_2$H$_4$CN | —C$_2$H$_4$OC$_2$H$_4$CN | —NHCOOC$_2$H$_5$ | Do. |
| 25 | NH$_2$-C$_6$H$_3$(CH$_3$)(NO$_2$)- | H | —C$_2$H$_4$OC$_2$H$_4$CN | H | —NHCOCH$_3$ | Yellowish red. |
| 26 | Same as No. 25 above | H | —C$_2$H$_4$OC$_2$H$_4$CN | H | —NHCOCH$_2$CH$_3$ | Do. |
| 27 | NH$_2$-C$_6$H$_3$(OCH$_3$)(NO$_2$)- | H | —C$_2$H$_4$OC$_2$H$_4$CN | H | —NHCOCH$_3$ | Dark red. |

| No. | Diazo Component | $R_1$ | $R_2$ | $R_3$ | X | Tint on polyester fiber |
|---|---|---|---|---|---|---|
| 28 | Same as No. 27 above | H | —$C_2H_4OC_2H_4CN$ | H | —$NHCOCH_2CH_3$ | Do. |
| 29 | 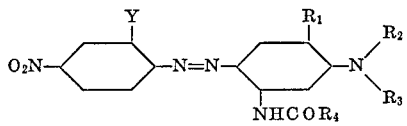 | H | —$C_2H_4OC_2H_4CN$ | H | —$NHCOOC_2H_5$ | Do. |

What is claimed is:

1. Water-insoluble monoazo dyestuffs of the formula

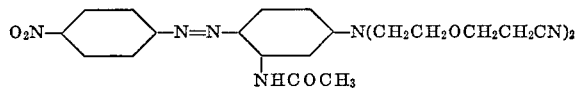

in which Y represents a member selected from the group consisting of a hydrogen, a chlorine and bromine atom, a lower alkyl group, a lower alkoxy, a lower carbalkoxy and a cyano group, $R_1$ represents a member selected from the group consisting of a hydrogen atom, a lower alkyl and a lower alkoxy group, $R_2$ represents a β-cyanoethoxyethyl group, $R_3$ represents a member selected from the group consisting of a hydrogen atom, a β-cyanoethoxyethyl and a lower alkanoyloxyethyl group and $R_4$ represents a member selected from the group consisting of lower alkyl and lower alkoxy groups.

2. The dyestuff of the formula

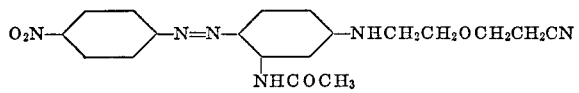

3. The dyestuff of the formula

O₂N—⟨ ⟩—N=N—⟨ ⟩—NHCH₂CH₂OCH₂CH₂CN
       |
       NHCOCH₃

4. The dyestuff of the formula

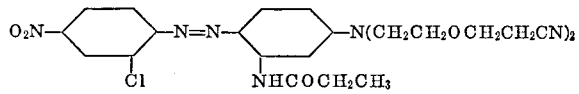

5. The dyestuff of the formula

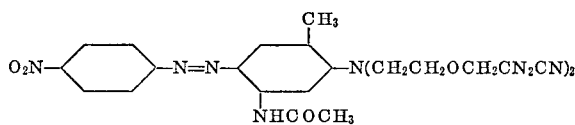

6. The dyestuff of the formula

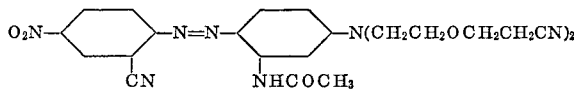

References Cited
FOREIGN PATENTS
204,665  8/1959  Austria.

CHARLES B. PARKER, *Primary Examiner.*

DONALD M. PAPUGA, *Assistant Examiner.*

U.S. Cl. X.R.

8—41, 55; 260—207, 465